United States Patent [19]

Alfano et al.

[11] Patent Number: 5,717,517
[45] Date of Patent: Feb. 10, 1998

[54] METHOD FOR AMPLIFYING LASER SIGNALS AND AN AMPLIFIER FOR USE IN SAID METHOD

[75] Inventors: Robert R. Alfano, Bronx; Vladimir V. Petricevic, New York; Ping Pei Ho, Great Neck, all of N.Y.

[73] Assignee: The Research Foundation of City College of New York, New York, N.Y.

[21] Appl. No.: 386,483

[22] Filed: Feb. 10, 1995

Related U.S. Application Data

[63] Continuation-in-part of Ser. No. 372,207, Jan. 13, 1995, abandoned.

[51] Int. Cl.$^6$ .............................. H01S 3/00; H01S 3/16
[52] U.S. Cl. .................. 359/342; 372/41; 372/39
[58] Field of Search ........................ 372/41, 68, 39, 372/42; 252/301.4 F, 301.4 H, 301.4 R; 359/342

[56] References Cited

U.S. PATENT DOCUMENTS

| | | | |
|---|---|---|---|
| 3,354,407 | 11/1967 | Howling | 331/94.5 |
| 3,725,811 | 4/1973 | Murphy | 331/94.5 |
| 4,627,064 | 12/1986 | Auzel et al. | 372/41 |
| 4,859,016 | 8/1989 | Shaw et al. | 350/96.15 |
| 4,927,768 | 5/1990 | Coughlin et al. | 436/172 |
| 4,932,031 | 6/1990 | Alfano et al. | 372/41 |
| 4,987,575 | 1/1991 | Alfano et al. | 372/41 |
| 5,202,777 | 4/1993 | Sluzky et al. | 359/50 |
| 5,434,878 | 7/1995 | Lawandy | 372/43 |
| 5,487,353 | 1/1996 | Scott et al. | 117/4 |
| 5,504,767 | 4/1996 | Jamison et al. | 372/41 |
| 5,524,011 | 6/1996 | Lawandy | 372/22 |

Primary Examiner—Mark Hellner
Attorney, Agent, or Firm—Kriegsman & Kriegsman

[57] ABSTRACT

A method for amplifying a signal pulse of laser light. Preferably, the method is used to amplify 1.3 μm and/or 1.55 μm signal pulses emitted from any 1.3 μm or 1.55 μm signal source, the method comprising providing an amplifying medium, the amplifying medium comprising an elongated core and a light-retaining outer structure surrounding the elongated core. The elongated core preferably comprises a plurality of $Cr^{4+}$-doped crystalline particles capable of lasing at 1.3 μm and/or 1.55 μm and preferably having a size of approximately 0.05 μm to 500 μm. The crystalline particles are dispersed within a non-gaseous medium, the non-gaseous medium having an index of refraction that substantially matches that of the crystalline particles. The method further comprises pumping the elongated core, either transversely or longitudinally, so as to excite the crystalline particles and transmitting the signal pulse of laser light through the elongated core while the crystalline particles are excited whereby the signal pulse of laser light becomes amplified. The present invention is also directed to an amplifier comprising the above-described amplifying medium in combination with a light source capable of pumping the elongated core in such a way as to excite the crystalline particles.

57 Claims, 2 Drawing Sheets

METHOD FOR AMPLIFYING LASER SIGNALS AND AN AMPLIFIER FOR USE IN SAID METHOD

The present application is a continuation-in-part of U.S. patent application Ser. No. 08/372,207, filed Jan. 13, 1995, now abandoned which is incorporated herein by reference.

BACKGROUND OF THE INVENTION

The present invention relates generally to the amplification of light signals and more particularly to a novel method for amplifying laser signals and to a novel amplifier for use in said method.

Over the last several years, fiberoptic communication has become a popular technique for communicating information. This is, in part, because fiberoptic communication has many advantages over conventional coaxial cable and metallic-wire links for the transmission of voice and data. These advantages include the capacity to transmit over a broader bandwidth and/or with reduced signal attenuation, the use of optical fibers, which having a smaller diameter, lighter weight and more flexible and durable construction, than do wire cables, the lack of crosstalk, better safety against short-circuiting, better security against wire-tapping, and the absence of inductive interference.

Typically, a fiberoptic communication system includes a transmitter module, an optical cable and a receiver module. The transmitter module typically comprises a light energy source, such as a laser, and a modulator, the transmitter module being used to convert an electrical signal into a light signal while it is being modulated. The transmitter module is closely coupled to one end of the optical cable, and the receiver module is closely coupled to the opposite end of the optical cable. The receiver module often comprises circuits for demodulating and amplifying the received signal, as well as photodiode or similar means for converting the light signals back into electrical signals while timing and decision circuits regenerate the information contained in the signals.

Where the distance between the transmitter module and the receiver module is great and the transmitted signal experiences losses in amplitude, the fiberoptic communication system frequently includes one or more repeaters which are regularly spaced between the transmitter and receiver modules and which are used to amplify the attenuated signal. One common type of repeater converts the optical signal into an electrical signal, amplifies the electrical signal and then converts the amplified electrical signal back into an optical signal. As can readily be appreciated, distortion of the signal frequently occurs as a result of converting the signal from the optical form to the electrical form and then back from the electrical form to the optical form. Another type of repeater comprises a glass fiber doped with erbium or a similar rare-earth ion. While this type of repeater is advantageous in that it keeps the signal in the optical form, such repeaters are very expensive.

In U.S. Pat. No. 4,987,575, inventors Alfano et al., which issued Jan. 22, 1991 and which is incorporated herein by reference, there is described a laser medium in the form of a dielectric crystal or glass doped with tetravalent chromium ($Cr^{4+}$). The dielectric crystals of the aforementioned patent are crystals of olivine-like structure, such as germanates of formula $(A)(RE)GeO_4$ where (A=Na or Li, RE=Y, Lu or Gd), crystals of willemite structure $Zn_2(Si$ or $Ge)O_4$ or any other single-crystal or polycrystalline compound containing tetrahedral sites in its crystal lattice, such as $Ca_3La_2(SiO_4)_6$ and $Y_3Al_5O_{12}$(YAG).

The tetravalent chromium-doped laser medium of the aforementioned patent can be used to generate laser emissions at wavelengths in the spectral region of approximately 1100 to 1700 nm. In particular, this laser medium has been found to be particularly well-suited for generating laser emissions at 1.3 µm and 1.55 µm—two key wavelengths used in fiberoptic communications. As can readily be appreciated, it would be highly desirable, by means other than those presently available and described above, to be able to amplify attenuated laser signals generated using the above-described tetravalent chromium-doped laser medium, as well as to amplify attenuated light signals generated by other media capable of generating light signals at those wavelengths commonly used in fiberoptic communications.

Similar optical (and potential lasing) properties to those exhibited by various Cr-doped laser materials may be expected from other transition-ion-doped crystals where the dopant ion has the same electronic structure as Cr, namely, a closed inner shell in the argon configuration with an additional two valence electrons in a 3d state. The most promising candidate $3d^2$ ion is trivalent vanadium ($V^{3+}$) placed in a tetrahedrally coordinated site of a host crystal.

SUMMARY OF THE INVENTION

It is an object of the present invention to provide a novel method for amplifying laser pulses and to provide a novel amplifier for use in said method.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

In furtherance of the above and other objects to be described in or apparent from the description below, a method for amplifying a signal pulse of laser light is hereinafter provided, said method comprising the steps of (a) providing an amplifying medium, said amplifying medium comprising (i) an elongated core, said elongated core comprising a non-gaseous medium and a plurality of crystalline particles, said non-gaseous medium having an index of refraction that substantially matches that of the crystalline particles, the crystalline particles being dispersed within the non-gaseous medium and being capable of lasing at the same wavelength as the wavelength of the signal pulse of laser light, and (ii) a light-retaining outer structure surrounding said elongated core; (b) pumping said elongated core so as to excite the crystalline particles; and (c) transmitting the signal pulse of laser light through said elongated core while the crystalline particles are excited; (d) whereby the signal pulse of laser light becomes amplified.

In a preferred embodiment, the signal pulse of laser light is generated by a $Cr^{4+}$-doped laser, such as a $Cr^{4+}$:forsterite laser, a $Cr^{4+}$:YAG laser or the like, or a 1.3 µm or 1.5 µm laser diode, and the core of the amplifying medium comprises $Cr^{4+}$-doped crystalline particles embedded in an index-matching glass, polymer, plastic, liquid or gel.

Preferably, the crystalline particles have a size of approximately 0.05 µm to 500 µm. The light-retaining outer structure is preferably made of glass, plastic or polymer material having a refractive index sufficiently lower than that of the core so as to trap radiation inside the core. The inside or outside of the light-retaining outer structure may additionally be coated with a high reflectivity, low loss, metallic or dielectric material to enhance confinement within the core. The elongated core may be pumped either longitudinally or transversely.

The present invention is also directed to an amplifier comprising the above-described amplifying medium and means for pumping said elongated core so as to excite the crystalline particles.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
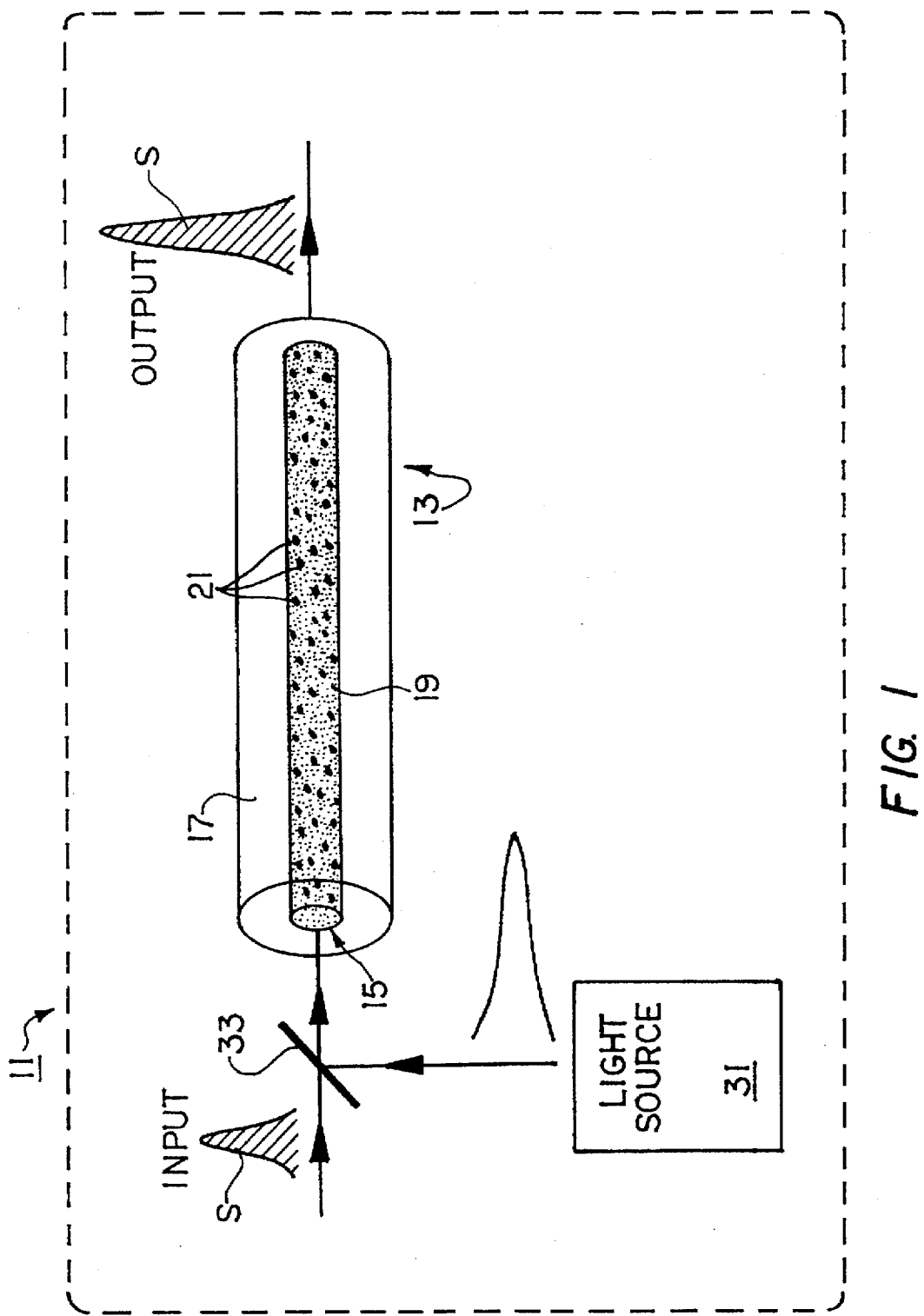
FIG. 1 is a schematic view of one embodiment of an amplifier constructed according to the teachings of the present invention for amplifying a signal pulse of laser light, the amplifier being shown used to amplify a signal pulse of laser light.

Referring now to FIG. 1, there is shown a schematic view of one embodiment of an amplifier constructed according to the teachings of the present invention for amplifying a signal pulse of laser light, the amplifier being shown used to amplify a signal pulse of laser light S and being represented generally by reference numeral 11.

Amplifier 11 comprises an amplifying medium 13. Amplifying medium 13 includes an elongated, cylindrically-shaped core 15 and a light-retaining outer structure 17 which axially surrounds core 15. The longitudinal axis of core 15 is disposed along the path of the signal pulse of laser light S.

Elongated core 15, which preferably has a diameter of between about 3 µm and 5 mm and preferably has a length of about 1 cm to about 2 m, comprises a transparent non-gaseous medium 19 and a plurality of crystalline particles 21, particles 21 being randomly dispersed throughout medium 19. Particles 21 are made of a material that is capable of lasing at the same wavelength as the wavelength of the signal pulse of laser light S. Where the signal pulse of laser light has a wavelength in the spectral range between approximately 1100 to 1700 nm, e.g., 1.3 µm or 1.55 µm, crystalline particles 21 are preferably $Cr^{4+}$-doped crystalline particles or $V^{3+}$-doped crystalline particles. More preferably, crystalline particles 21 are $Cr^{4+}$-doped crystalline particles of olivine-like structure, any other $Cr^{4+}$-doped single-crystal or polycrystalline compound containing tetrahedral sites in its crystal lattice and capable of lasing at approximately 1.3 µm or 1.55 µm, $V^{3+}$-doped crystalline particles of wurtzite structure or any other $V^{3+}$-doped single-crystal or polycrystalline compound containing tetrahedral sites in its crystal lattice and capable of lasing at approximately 1.3 µm or 1.55 µm. Examples of such $Cr^{4+}$-doped crystals include $Cr^{4+}:Y_3Al_5O_{12}$, $Cr^{4+}$:forsterite, $Cr^{4+}:Ca_2SiO_4$, $Cr^{4+}:Ca_2GeO_4$ and $Cr^{4+}:LiAlO_2$. Examples of such $V^{3+}$-doped crystals include $V^{3+}$-doped galates or aluminates of formula $AMO_2$ where A=Li, Na or K and M=Al or Ga, such as $V^{3+}:LiGaO_2$ and $V^{3+}:LiAlO_2$. The crystalline particles preferably have a size ranging from about 0.05 µm to about 500 µm, the particle size being selected to optimize gain characteristics and to minimize losses.

Non-gaseous medium 19, which may be a liquid, a gel or a solid (e.g., a glass, a plastic or some other polymer), has an index of refraction that substantially matches that of crystalline particles 21 so as to reduce the scattering of light passing through elongated core 15. The difference in the respective indices of refraction of medium 19 and particles 21 is preferably about 0 to 0.1. Examples of suitable materials usable as non-gaseous medium 19 are listed in the TABLE below.

TABLE

| Material | Index of Refraction |
| --- | --- |
| Poly(styrene) | 1.59–1.592 |
| Poly(vinylidene chloride) | 1.60–1.63 |
| Poly(sulfides) | 1.6–1.7 |
| Poly(pentachlorophenil metacrylate) | 1.608 |
| Poly(phenyl α-bromoacrylate) | 1.612 |
| Poly(N-vinylphtalimide) | 1.62 |
| Poly(β-napthil metacrylate) | 1.6298 |
| Poly(2-vinylthiophene) | 1.6376 |
| Poly(α-napthil metacrylate) | 1.6410 |
| Poly(vinyl phenil sulfide) | 1.6568 |
| Butylphenol formaldehyde resin | 1.66 |
| Poly(vinylnapthalene) | 1.6818 |
| Poly(vinylcarbazole) | 1.683 |
| Napthalene-formaldehyde resin | 1.696 |
| Phenol-formaldehyde resin | 1.70 |
| Poly(pentabromophenyl metacrylate) | 1.71 |

Light-retaining outer structure 17 is made of a material whose refractive index is sufficiently lower than that of medium 19 so as to prevent radiation from escaping through the sides of core 15. Preferably, the difference in the respective refractive indices is about 0.01 to about 0.2. Examples of suitable materials for structure 17 include certain glasses, plastics and polymers. Although not shown, the inside or outside of structure 17 may be coated with a high reflectivity, low loss, metallic or dielectric material intended to further prevent the dissipation of light through the sides of core 15.

Depending upon the materials involved, amplifying medium 13 may be made according to several different techniques. According to one manufacturing technique, the material used to form outer structure 17 is provided in the form of a hollow capillary tube. This tube is then filled with the material used to form core 15. According to another manufacturing technique, the material used to form core 15 is provided in solid form and is shaped into an appropriately sized fiber. The material used to form outer structure 17 is then deposited around the core in the form of a cladding.

Amplifier 11 also include means for pumping elongated core 15 so as to excite crystalline particles 21. In the present embodiment, said pumping means comprises a light source 31, which may be a semiconductor laser, a solid-state laser or a flashlamp, which emits pumping light in the absorption region of the crystalline particles.

Amplifier 11 further includes a mirror 33 for causing the light emitted by light source 31 to pass longitudinally through elongated core 15. It is to be understood that the light emitted by source 31 need not pass longitudinally through elongated core 15 and could, if desired, pass transversely through core 15. This could be achieved, for example, by making structure 17 transmissive for the pumping light and not the signal pulse S or by forming a window in structure 17 that is transmissive for the pumping light and not the signal pulse S.

To use amplifier 11 to amplify signal pulse S, one merely transmits signal pulse S through core 15 while core 15 is in its excited state, i.e., either at the same time or immediately after pumping light has been transmitted therethrough.

Figure 2:
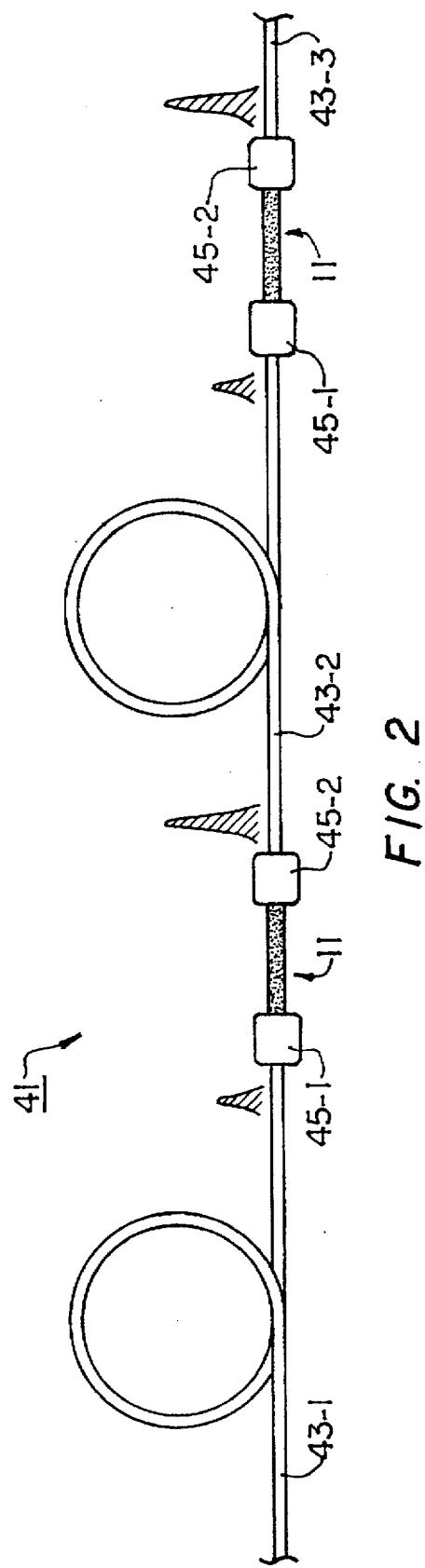
FIG. 2 is a schematic view of a portion of a fiberoptic communication system which includes a plurality of amplifiers of the type shown in FIG. 1.

Referring now to FIG. 2, there is shown a schematic view of a portion of a fiberoptic communication system which includes a plurality of amplifiers of the type shown in FIG. 1, the fiberoptic communication system being represented generally by reference numeral 41.

System 41 includes a series of long-distance optical fibers 43-1 through 43-3. Fibers 43-1 and 43-2 are interconnected by a first amplifier 11 and a first pair of couplers 45-1 and 45-2, and fibers 43-2 and 43-3 are interconnected by a second amplifer 11 and a second pair of couplers 45-1 and 45-2.

Figure 3:
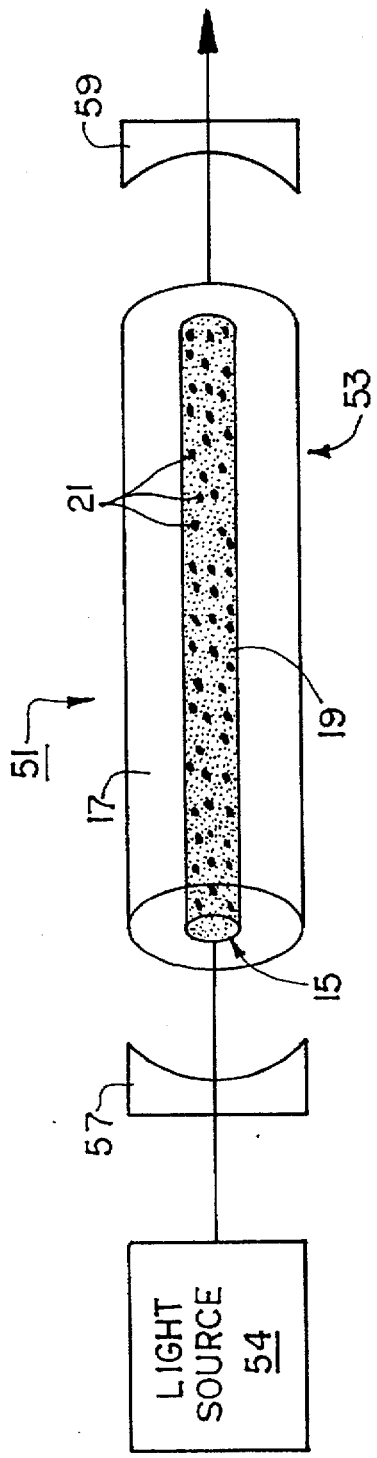
FIG. 3 is a schematic view of one embodiment of a laser constructed according to the teachings of the present invention.

Referring now to FIG. 3, there is shown a schematic view of one embodiment of a laser constructed according to the teachings of the present invention, the laser being represented generally by reference numeral 51.

Laser 51 includes a laser medium 53, means for pumping laser medium 53 and a pair of end mirrors 57 and 59, respectively. In the present embodiment, the pumping means is a light source 54. Laser medium 53 and light source 54 may be identical to amplifying medium 13 and light source 31, respectively, of amplifier 11. End mirror 57 is designed for maximum transmissivity of light at the pumping frequency and for maximum reflectivity at the emission frequency of laser medium 53. End mirror 59 is designed for partial reflectivity at the emission frequency of laser medium 53.

The embodiments of the present invention described above are intended to be merely exemplary and those skilled in the art shall be able to make numerous variations and modifications to it without departing from the spirit of the present invention. For example, elongated core 15 could be rectangular in cross-section, preferably having a thickness of about 3 µm to about 5 mm, instead of being circular in cross-section. All such variations and modifications are intended to be within the scope of the present invention as defined in the appended claims.

What is claimed is:

1. A method for amplifying a signal pulse of laser light, said method comprising the steps of:
   (a) providing an amplifying medium, said amplifying medium comprising
      (i) an elongated core, said elongated core comprising a non-gaseous medium and a plurality of crystalline particles, said non-gaseous medium having an index of refraction that substantially matches that of the crystalline particles, the crystalline particles being dispersed within the non-gaseous medium and being capable of lasing at the same wavelength as the wavelength of the signal pulse of laser light, and
      (ii) a light-retaining outer structure surrounding said elongated core;
   (b) pumping said elongated core so as to excite the crystalline particles; and
   (c) transmitting the signal pulse of laser light through said elongated core while the crystalline particles are excited;
   (d) whereby the signal pulse of laser light becomes amplified.

2. The method as claimed in claim 1 wherein the signal pulse of laser light has a wavelength in the spectral range between approximately 1100 to 1700 nm.

3. The method as claimed in claim 2 wherein the signal pulse of laser light has a wavelength selected from the group consisting of 1.3 µm and 1.55 µm.

4. The method as claimed in claim 2 wherein said crystalline particles are $Cr^{4+}$-doped crystalline particles.

5. The method as claimed in claim 4 wherein said $Cr^{4+}$-doped crystalline particles are $Cr^{4+}$-doped crystalline particles of olivine-like structure or any other $Cr^{4+}$-doped single-crystal or polycrystalline compound containing tetrahedral sites in its crystal lattice.

6. The method as claimed in claim 5 wherein said $Cr^{4+}$-doped crystalline particles are selected from the group consisting of $Cr^{4+}$:forsterite, $Cr^{4+}$:YAG, $Cr^{4+}$:Ca$_2$SiO$_4$, $Cr^{4+}$:Ca$_2$GeO$_4$ and $Cr^{4+}$:LiAlO$_2$.

7. The method as claimed in claim 4 wherein said $Cr^{4+}$-doped crystalline particles are between about 0.05 µm and 500 µm in size.

8. The method as claimed in claim 2 wherein said crystalline particles are $V^{3+}$-doped crystalline particles.

9. The method as claimed in claim 8 wherein said $V^{3+}$-doped crystalline particles are $V^{3+}$-doped crystalline particles of wurtzite structure or any other $V^{3+}$-doped single-crystal or polycrystalline compound containing tetrahedral sites in its crystal lattice.

10. The method as claimed in claim 9 wherein said $V^{3+}$-doped crystalline particles are selected from the group consisting of $V^{3+}$:LiGaO$_2$ and $V^{3+}$:LiAlO$_2$.

11. The method as claimed in claim 8 wherein said $V^{3+}$-doped crystalline particles are between about 0.05 µm and 500 µm in size.

12. The method as claimed in claim 1 wherein said elongated core is circular in cross-section.

13. The method as claimed in claim 12 wherein said elongated core has a diameter of between about 3 µm to about 5 mm.

14. The method as claimed in claim 1 wherein said elongated core is rectangular in cross-section.

15. The method as claimed in claim 14 wherein said elongated core is between about 3 µm to about 5 mm thick.

16. The method as claimed in claim 1 wherein said elongated core is about 1 cm to about 2 m in length.

17. The method as claimed in claim 1 wherein the difference between the respective indices of refraction of the crystalline particles and said elongated core is between 0 to about 0.1.

18. The method as claimed in claim 1 wherein the non-gaseous medium is selected from the group consisting of glasses, polymers, gels, and liquids.

19. The method as claimed in claim 1 wherein said pumping step comprises pumping said elongated core longitudinally.

20. The method as claimed in claim 1 wherein said pumping step comprises pumping said elongated core transversely.

21. The method as claimed in claim 1 wherein said pumping step comprises pumping said elongated core with light emitted from a semiconductor laser; a solid-state laser or a flashlamp which emits in the absorption region of the crystalline particles.

22. The method as claimed in claim 1 wherein said transmitting step comprises transmitting the signal pulse of laser light longitudinally through said elongated core.

23. The method as claimed in claim 1 wherein said light-retaining outer structure is a cladding.

24. The method as claimed in claim 23 wherein the difference between the respective indices of refraction of said non-gaseous medium and said cladding is between about 0.01 and about 0.2.

25. An amplifier for amplifying a signal pulse of laser light, said amplifier comprising:
   (a) an amplifying medium, said amplifying medium comprising
      (i) an elongated core, said elongated core comprising a non-gaseous medium and a plurality of crystalline particles, said non-gaseous medium having an index of refraction that substantially matches that of the crystalline particles, the crystalline particles being dispersed within the non-gaseous medium and being capable of lasing at the same wavelength as the wavelength of the signal pulse of laser light, and
      (ii) a light-retaining outer structure surrounding said elongated core; and
   (b) means for pumping said elongated core so as to excite the crystalline particles.

26. The amplifier as claimed in claim 25 wherein the signal pulse of laser light has a wavelength in the spectral range between approximately 1100 to 1700 nm and wherein said crystalline particles are $Cr^{4+}$-doped crystalline particles.

27. The amplifier as claimed in claim 26 wherein said $Cr^{4+}$-doped crystalline particles are $Cr^{4+}$-doped crystalline particles of oilvine-like structure or any other $Cr^{4+}$-doped single-crystal or polycrystalline compound containing tetrahedral sites in its crystal lattice.

28. The amplifier as claimed in claim 27 wherein said $Cr^{4+}$-doped crystalline particles are selected from the group consisting of $Cr^{4+}$:forsterite, $Cr^{4+}$:YAG, $Cr^{4+}$:$Ca_2SiO_4$, $Cr^{4+}$:$Ca_2GeO_4$ and $Cr^{4+}$:$LiAlO_2$.

29. The amplifier as claimed in claim 26 wherein said $Cr^{4+}$-doped crystalline particles are between about 0.05 μm and 500 μm in size.

30. The amplifier as claimed in claim 25 wherein the signal pulse of laser light has a wavelength in the spectral range between approximately 1100 to 1700 nm and wherein said crystalline particles are $V^{3+}$-doped crystalline particles.

31. The amplifier as claimed in claim 30 wherein said $V^{3+}$-doped crystalline particles are $V^{3+}$-doped crystalline particles of wurtzite structure or any other $V^{3+}$-doped single-crystal or polycrystalline compound containing tetrahedral sites in its crystal lattice.

32. The amplifier as claimed in claim 31 wherein said $V^{3+}$-doped crystalline particles are selected from the group consisting of $V^{3+}$:$LiGaO_2$ and $V^{3+}$:$LiAlO_2$.

33. The amplifier as claimed in claim 30 wherein said $Cr^{4+}$-doped crystalline particles are between about 0.05 μm and 500 μm in size.

34. The amplifier as claimed in claim 25 wherein said elongated core is circular in cross-section.

35. The amplifier as claimed in claim 34 wherein said elongated core has a diameter of about 3 μm to about 5 mm.

36. The amplifier as claimed in claim 25 wherein said elongated core is rectangular in cross-section.

37. The amplifier as claimed in claim 36 wherein said elongated core has a thickness of about 3 μm to about 5 mm.

38. The amplifier as claimed in claim 25 wherein said elongated core is about 1 cm to about 2 m in length.

39. The amplifier as claimed in claim 25 wherein said non-gaseous medium is a solid.

40. The amplifier as claimed in claim 25 wherein said non-gaseous medium is a liquid or a gel.

41. The amplifier as claimed in claim 25 wherein the difference between the respective indices of refraction of said non-gaseous medium and said crystalline particles is between 0 and about 0.1.

42. The amplifier as claimed in claim 25 wherein said light-retaining outer structure is a cladding.

43. The amplifier as claimed in claim 41 wherein the difference between the respective indices of refraction of said non-gaseous medium and said cladding is between 0.01 and about 0.2.

44. A laser comprising:
   (a) a laser medium, said laser medium comprising
      (i) an elongated core, said elongated core comprising a non-gaseous medium and a plurality of crystalline particles, said non-gaseous medium having an index of refraction that substantially matches that of the crystalline particles, the crystalline particles being dispersed within the non-gaseous medium and being capable of lasing, and
      (ii) a light-retaining outer structure surrounding said elongated core;
   (b) a pair of end mirrors disposed at opposite ends of said elongated core; and
   (c) means for pumping said elongated core so as to excite the crystalline particles to emit coherent optical radiation.

45. The laser as claimed in claim 44 wherein said crystalline particles are $Cr^{4+}$-doped crystalline particles.

46. The laser as claimed in claim 45 wherein said $Cr^{4+}$-doped crystalline particles are $Cr^{4+}$-doped crystalline particles of olivine-like structure or any other $Cr^{4+}$-doped single-crystal or polycrystalline compound containing tetrahedral sites in its crystal lattice.

47. The laser as claimed in claim 46 wherein said $Cr^{4+}$-doped crystalline particles are selected from the group consisting of $Cr^{4+}$:forsterite, $Cr^{4+}$:YAG, $Cr^{4+}$:$Ca_2SiO_4$, $Cr^{4+}$:$Ca_2GeO_4$ and $Cr^{4+}$:$LiAlO_2$.

48. The laser as claimed in claim 44 wherein said crystalline particles are $V^{3+}$-doped crystalline particles.

49. The laser as claimed in claim 48 wherein said $V^{3+}$-doped crystalline particles are V3+-doped crystalline particles of wurtzite structure or any other $V^{3+}$-doped single-crystal or polycrystalline compound containing tetrahedral sites in its crystal lattice.

50. The laser as claimed in claim 49 wherein said $V^{3+}$-doped crystalline particles are selected from the group consisting of $V^{3+}$:$LiGaO_2$ and $V^{3+}$:$LiAlO_2$.

51. An optical amplifier for the 1.3 μm and 1.55 μm wavelengths comprising:
   a. an amplifying gain medium comprising 0.05 -μm to 500 -μm size crystalline particles of trivalent vanadium $(V)^{3+}$-doped laser crystal suspended in a nearly index matching transparent material, and
   b. optical means for exciting said amplifying medium with wavelengths in the absorption region of said $V^{3+}$-doped crystallites.

52. A laser for the 1.3 μm and 1.55 μm wavelengths comprising:
   a. an amplifying laser medium comprising 0.05-μm to 500-μm size crystalline particles of trivalent vanadium $(V^{3+})$-doped laser crystal suspended in a nearly index matching transparent material,
   b. optical means for exciting said amplifying medium with wavelengths in the absorption region of said $(V^{3+})$-doped crystallites, and c. a pair of end mirrors disposed at opposite ends of said amplifying laser medium.

53. $V^{3+}$ doped crystallites of wurtzite structure of formula (A)(M)$O_2$, (where A=Li, Na, or K;M=Al or Ga).

54. An active medium for use in a laser and an amplifier comprising a single crystal of dielectric material doped with vanadium ions in the trivalent state, the single crystal being a crystal of wurtzite structure of formula (A)(M)$O_2$, (where A=Li, Na, or K;M=Al or Ga).

55. A laser medium or amplifier medium comprising:

a. a flexible hollow or solid cylindrical structure with a core diameter ranging from 3 μm for amplification in a single-mode fiber systems up to few mm for multimode fiber systems with a larger outside diameter, b. a gain medium comprising $V^{3+}$-doped crystallites of submicron and micron size suspended in an index-matching glass, polymer, plastic, or liquid in the core, and c. a structure surrounding the core made of plastic, glass, or polymer material with refractive index lower than the core to trap the radiation inside the core, the inside or the outside of the surrounding structure being coated with a high reflectivity, low loss metallic or dielectric material to enhance amplification and confinement.

56. An article of manufacture comprising a non-gaseous medium and a plurality of crystalline particles, said non-gaseous medium having an index of refraction that substantially matches that of the crystalline particles, the crystalline particles being dispersed within the non-gaseous medium, being capable of lasing and being selected from the group consisting of $Cr^{4+}$-doped crystalline particles and $V^{3+}$-doped crystalline particles.

57. An article of manufacture comprising:

(a) an elongated core, said elongated core comprising a non-gaseous medium and a plurality of crystalline particles, said non-gaseous medium having an index of refraction that substantially matches that of the crystalline particles, the crystalline particles being dispersed within the non-gaseous medium, being capable of lasing and being selected from the group consisting of $Cr^{4+}$-doped crystalline particles and $V^{3+}$-doped crystalline particles; and (b) a light retaining outer structure surrounding said elongated core.

* * * * *